United States Patent [19]
Geiger

[11] Patent Number: 5,950,420
[45] Date of Patent: Sep. 14, 1999

[54] METHOD AND ARRANGEMENT FOR CONTROLLING EXHAUST EMISSIONS FROM AN INTERNAL COMBUSTION ENGINE

[75] Inventor: Istvan Geiger, Braunschweig, Germany

[73] Assignee: Volkswagen AG, Wolfsburg, Germany

[21] Appl. No.: 08/914,976

[22] Filed: Aug. 20, 1997

[30] Foreign Application Priority Data

Aug. 24, 1996 [DE] Germany .......................... 196 34 263

[51] Int. Cl.$^6$ .............................. F01N 3/02; F02M 25/07
[52] U.S. Cl. ................................ 60/274; 60/278; 60/286; 60/311
[58] Field of Search ............................ 60/274, 278, 279, 60/286, 303, 311

[56] References Cited

U.S. PATENT DOCUMENTS 4,991,396  2/1991  Goerlich et al. .......................... 60/303

5,390,492  2/1995  Levendis .................................... 60/278

FOREIGN PATENT DOCUMENTS 3821138   3/1989  Germany .
4234841   4/1993  Germany .
4340463  11/1995  Germany .

*Primary Examiner*—Tony M. Argenbright
*Attorney, Agent, or Firm*—Baker & Botts, L.L.P.

[57] ABSTRACT

An internal combustion engine has a particle filter in an exhaust gas line for filtering solid particles contained in the exhaust gas, and includes a supplementary burner to which the solid particles are supplied from the filter and in which the particles are burned. The combustion gases from the supplementary burner are introduced into the air intake line for the engine, permitting a reduction in solid particles emitted into the environment when the $NO_x$ content of the exhaust gases is reduced.

16 Claims, 1 Drawing Sheet

METHOD AND ARRANGEMENT FOR CONTROLLING EXHAUST EMISSIONS FROM AN INTERNAL COMBUSTION ENGINE

BACKGROUND OF THE INVENTION

This invention relates to methods and arrangements for controlling the exhaust emissions from an internal combustion engine having a particle filter in an exhaust gas line for filtering solid particles from the exhaust gas.

German Offenlegungsschrift No. 38 21 138 discloses filtration and postcombustion of the solid particles, or soot, in a particle filter and utilization of the heat energy obtained therefrom for the heating of a vehicle interior but no recirculation of the exhaust gases of the internal combustion engine is provided.

A similar arrangement is disclosed in U.S. Pat. No. 4,991,396. This arrangement also has a burner for regenerating the soot filter and the heat energy produced in the burner is likewise used for heating and vehicle interior when the engine exhaust gases do not provide sufficient heat for heating the vehicle.

In both those disclosures, the exhaust gases from burning of the solid particles are released into the environment.

German Offenlegungsschrift No. 42 34 841 and German Patent No. 43 40 463 describe internal combustion engines having a soot filter which is regenerated and also describe recirculation of exhaust gas from the engine. In these arrangements, however, burning of the soot particles takes place in the soot filter, having the disadvantage that the burning is uncontrolled and explosive. In addition, the gases produced by burning of the particles are released into the environment.

SUMMARY OF THE INVENTION

Accordingly, it is an object of the present invention to provide a method and an arrangement for controlling exhaust emissions from an internal combustion engine which eliminate the disadvantages of the prior art.

Another object of the invention is to provide a method and an arrangement for controlling exhaust emissions by which the pollutant fractions in the exhaust gas from an internal combustion engine can be reduced.

These and other objects of the invention are attained by filtering solid particles from the exhaust gases and burning the particles in a supplementary burner and conveying the combustion gases from the supplementary burner into the air intake line of the internal combustion engine or into a line which is or can be fluidically connected to the air intake line. Conveying of the combustion gases from the supplementary burner into the air intake line may take place directly by connecting the supplementary burner to the air intake line or through a separate combustion gas return line. Emission of combustion gases from the supplementary burner into the environment is thereby prevented.

A supplementary burner of this type may be arranged to provide additional heating of the vehicle interior in vehicles having modern internal combustion engines with very high efficiencies, in which, for example in the hot-running phase, insufficient heat is available for heating the vehicle interior. For this purpose, the heat generated from combustion of the particles in the supplementary burner is transmitted to a heat exchange medium. At the same time, the combustion gases resulting from burning of the particles are cooled. Recirculation of cooled combustion gases to the air intake for the engine is highly desirable since the power of the internal combustion engine is thereby increased in a known manner.

If an airflow meter is provided in the air intake line of the internal combustion engine, the combustion gases from the supplementary burner are preferably introduced into the air intake line or into a line which is or can be fluidically connected to the air intake line downstream of the airflow meter in the direction of flow of the fresh air. This avoids introduction of errors into the measurement of the amount of fresh air drawn into the air intake line. For a desired exhaust gas recirculation rate, a specific desired quantity of fresh air in the air intake line is calculated and the quantity of fresh air is measured by an airflow meter. If the actual quantity of fresh air deviates from the desired fresh air quantity, the exhaust gas recirculation is correspondingly readjusted by a valve until the desired fresh air quantity, and consequently the desired exhaust gas recirculation rate, are obtained. Recirculating the combustion gases from the supplementary burner at a point downstream of the airflow meter assures that it does not introduce errors into the fresh air quantity measurement and therefore that the exhaust gas recirculation rate can be regulated using the fresh air quantity measurement and the valve in the exhaust gas recirculation line despite the additional introduction of combustion gases from the supplementary burner.

If an exhaust gas turbocharger is provided, the combustion gases from the supplementary burner are introduced into the air intake line upstream of the compressor for the turbocharger in the direction of flow of the fresh air. This prevents the compressor from forcing fresh air out of the air intake line into the combustion gas line from the supplementary burner.

The burner for burning the solid particles collected in the filter is turned on either when the heating of the vehicle interior is actuated, particularly when the engine is in its hot-running condition, or when the temperature of the internal combustion engine is below a predetermined temperature, or when the particle filter is to be regenerated.

The particle filter is regenerated when the quantity of solid particles in the particle filter exceeds a predetermined value. This may occur intermittently, either when the predetermined particle quantity is exceeded during normal driving or when, for briefly cleaning an $NO_x$ accumulator, the internal combustion engine is run with a richer mixture and consequently the particle quantity increases. During the regeneration of the particle filter, the particles from the particle filter are conveyed into the supplementary burner, for example by being blown out of the filter. This operation is sensed by an appropriate detector and causes the supplementary burner to be turned on.

According to the invention, the heat energy obtained as a result of the combustion of the soot particles can be utilized for heating the interior of the vehicle in those conditions in which the engine exhaust gases do not provide a sufficient heat content. Utilizing the heat energy obtained as a result of the combustion of the soot particles in order to heat the vehicle interior achieves a sufficient heating of the latter, particularly when the engine is in its hot-running condition.

Furthermore, the heat energy obtained from burning solid particles may also be utilized for heating the internal combustion engine in the cold state and therefore for reaching its operating temperature more quickly.

Moreover, it is possible for the operating temperature of the internal combustion engine to fall below the optimum operating temperature, for example, on downward runs in hilly country. In this case, the heat obtained from the supplementary burner may be utilized for raising the operating temperature of the internal combustion engine.

A conventional Venturi tube is provided as a simple arrangement for introducing the combustion gases from the supplementary burner into the air intake line or into a line which is or can be fluidically connected to the air intake line. A static pressure drop is produced in the Venturi tube as a result of the acceleration of the air flow in the tube, causing the combustion gases from the supplementary burner to be drawn into the tube.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
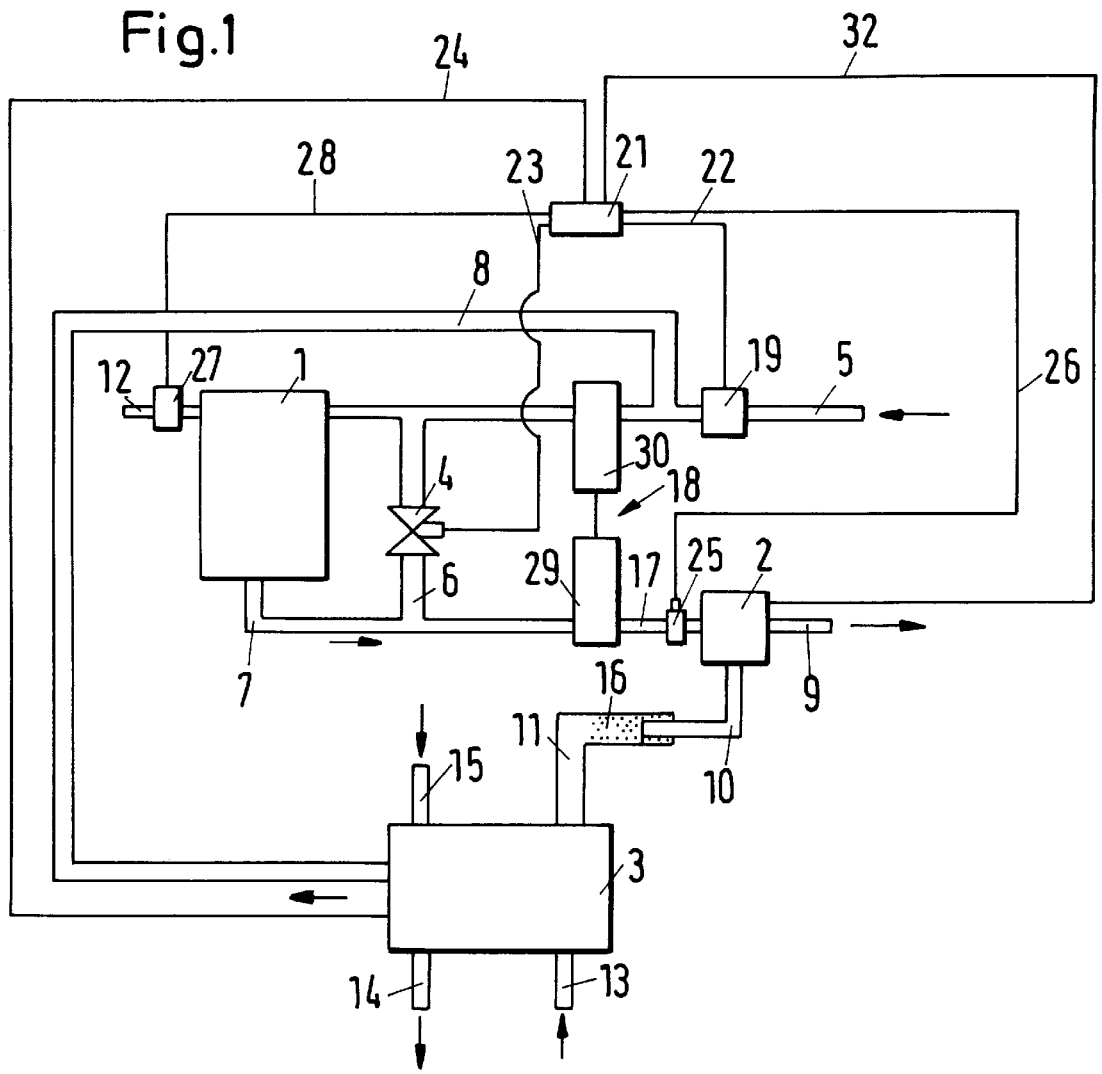
FIG. 1 is a schematic diagram illustrating a representative embodiment of an internal combustion engine having exhaust gas recirculation, a particle filter and a supplementary burner in accordance with the invention.

In the typical embodiment of the invention illustrated diagrammatically in FIG. 1, an internal combustion engine 1 which may, for example, be a compression ignition engine such as a Diesel engine, is supplied with fuel through a first fuel line 12 under the control of an actuating device 27 and draws in fresh air through an air intake line 5. Engine exhaust gases are transmitted through an exhaust line 7 having a solid particle filter 2 and some of the engine exhaust gases are recirculated under the control of a valve 4 to the air intake line 5 by an exhaust gas recirculation line 6 for mixing with the fresh intake air.

In accordance with the invention a supplementary burner 3 is arranged to receive solid particles from the filter 2 a well as fuel from a second fuel line 15 and the combustion gases from burning of the solid particles in the supplementary burner 3 are also conveyed through a line 8 to the air intake line 5 where they are mixed with the fresh air being supplied to the engine. Alternatively, the combustion gases from the burner 3 may be directed into the exhaust gas recirculation line 6 or may be introduced at another point into the air intake line 5.

Figure 2:
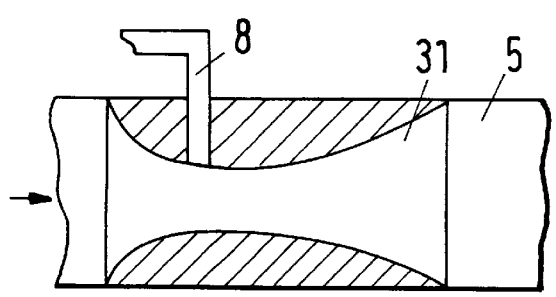
FIG. 2 is a fragmentary sectional view showing a Venturi tube for the introduction of combustion gases from the supplementary burner.

A simple arrangement for introducing the combustion gases from the supplementary burner using a Venturi tube 31 is shown in FIG. 2. The combustion gases from the supplementary burner 3 are introduced through the line 8 into the Venturi tube 31 which is positioned in the air intake line 5 so that the fresh air flows through the Venturi tube 31 in the direction of the arrow. The air flow is accelerated in the reduced diameter portion and, due to the Venturi effect, the static pressure is reduced in that portion. As a result of the reduced static pressure, the combustion gases are aspirated out of the line 8 into the air intake line 5.

The portion of the exhaust gases from the internal combustion engine which is not recirculated through the exhaust gas recirculation line 6 is conducted through the particle filter 2 and, after filtration, is emitted into the environment through exhaust pipe 9.

When a predetermined content of solid particles in the filter 2 is exceeded, the particles in the filter are drawn out through a line 10 and mixed with fresh air in a suction line 11 where they are conveyed to the supplementary burner 3, preferably by an air stream.

The solid particles conveyed from the filter 2 through the line 10 may, if desired, also be conducted directly into the combustion space of the supplementary burner 3, or they may be admixed with the fuel flowing into the burner through the second fuel line 15.

When a sensor in the particle filter 2 or in the line 10 detects that solid particles are being conducted into the supplementary burner 3, a signal is transmitted through a signal line 32 to a control unit 21 which, in turn, turns on the burner 3 through a signal line 24.

In the supplementary burner 3, the fuel supplied through the second fuel line 15 is intermixed with the fresh air and the solid particles and burned. The heat energy thereby released is transmitted within the burner to a suitable heat exchange medium such as, for example, water. The heat exchange medium is supplied to the supplementary burner 3 through an intake line 13 and is discharged through an outlet line 14 by which the heated medium may be conveyed to the engine or to the vehicle space heater, for example. It would, of course, also be possible to cause the engine coolant to flow around the supplementary burner 3 directly, for example by installing the burner in a radiator of an automobile. By installing the supplementary burner in the radiator, the heat generated by it can be transmitted conveniently to the vehicle interior or to the internal combustion engine.

An airflow meter 19, by which the flow fresh air is measured, is positioned in the air intake line 5 and provides an air flow signal to the control unit 21 through a signal line 22. The control unit 21 determines the exhaust gas recirculation rate based on the rate of flow of fresh air in the air intake line 5. The combustion gases from the supplementary burner 3 are introduced from the pipe 9 into the air intake line downstream of the airflow meter 19 in the direction of flow of the fresh air so that no errors are introduced into the measurement of the fresh air flow.

If the calculated exhaust gas recirculation rate deviates from the desired exhaust gas recirculation rate, the amount of exhaust gas recirculation through the exhaust gas recirculation line 6 is adjusted by the valve 4 until the calculated exhaust gas recirculation rate coincides with the desired exhaust gas recirculation rate, taking into account predetermined tolerances. The introduction of the combustion gases from the supplementary burner 3 into the air intake line 5 downstream of the air flow meter 19 therefore has no adverse effect on the regulation of the exhaust gas recirculation.

An exhaust gas turbocharger 18 driven by a turbine 29 in the exhaust gas line 7 has a compressor 30 positioned in the air intake line 5 and the combustion gases from the supplementary burner 3 are introduced into the air intake line 5 upstream of the compressor 30 in the direction of flow of the fresh air as shown in FIG. 1. This prevents fresh air from being forced into the combustion gas line 8 by the compressor.

A lambda probe 25 in the exhaust line 7 supplies a lambda signal to the control unit 21 and, based on the lambda signal, the control unit transmits an actuating signal on a line 28 to the actuating device 27 in the first fuel line 12 to control the fuel supply to the engine.

Figure 3:
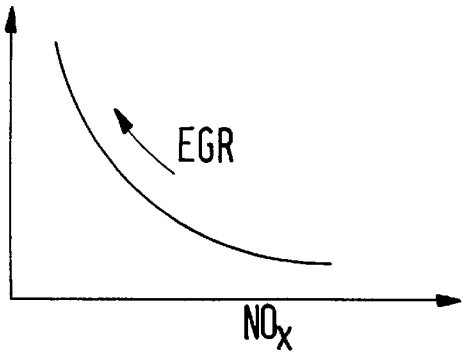
FIG. 3 is a graphical illustration showing the relation between the solid particles and the $NO_x$ fractions in the exhaust gas with an increasing exhaust gas recirculation rate.

The relation between the $NO_x$ fraction and the solid particle fraction in the exhaust gas for increasing exhaust gas recirculation is shown graphically in FIG. 3 where the solid particle content is shown on the ordinate and the $NO_x$ content is shown on the abscissa.

The $NO_x$ fraction of the exhaust gas is reduced in a known manner by exhaust gas recirculation. One disadvantage, however, is that, due to exhaust gas recirculation, the combustion space temperature is lowered and, consequently, the solid particle fraction in the exhaust gas increases. Filtration of the solid particles from the exhaust gas in the particle filter 2 and burning of the particles in the supplementary burner 3 makes it possible to avoid emitting an increased solid particle fraction into the environment when the $NO_x$ content is reduced. The invention thus makes it possible to increase the exhaust gas recirculation rate to reduce further the $NO_x$ content in the exhaust gas without the solid particle content being increased in the exhaust gas emitted into the environment through the exhaust pipe 9.

Although the invention has been described herein with reference to specific embodiments, many modifications and variations therein will readily occur to those skilled in the art. Accordingly, all such variations and modifications are included within the intended scope of the invention.

I claim:

1. A method for controlling exhaust emissions from an internal combustion engine having a particle filter in an exhaust gas line from the internal combustion engine for filtering solid particles contained in the exhaust gas comprising:

supplying solid particles from the filter to a supplementary burner in which the particles are burned;

transmitting combustion gases from the supplementary burner into an air intake line for the internal combustion engine; and introducing the combustion gases from the supplementary burner into the air intake line at a location downstream of an airflow meter with respect to the direction of flow of the fresh air in the air intake line.

2. A method according to claim 1 wherein the engine includes an exhaust gas turbocharger having a turbine in the exhaust gas line and a compressor in the air intake line and including the step of:

introducing the combustion gases from the supplementary burner into the air intake line at a location upstream of the compressor in the direction of flow of the fresh air in the air intake line.

3. A method according to claim 1 including the step of:

recirculating some of the exhaust gas from the internal combustion engine from the exhaust gas line into the air intake line through a valve and an exhaust gas recirculation line.

4. A method according to claim 1 including the step of:

conveying particles from the particle filter to the supplementary burner by an air stream.

5. A method according to claim 1 including the step of:

supplying particles from the filter to the supplementary burner when a predetermined particle content in the particle filter is exceeded.

6. A method according to claim 1 including the step of:

turning on the supplementary burner when the particles from the particle filter are supplied to the supplementary burner.

7. A method according to claim 1 including the step of:

utilizing the heat energy released as a result of the combustion of the particles for heating a vehicle interior.

8. A method according to claim 1 including the step of:

utilizing the heat energy released as a result of the combustion of the particles for heating the internal combustion engine or for increasing the operating temperature of the internal combustion engine.

9. An arrangement for controlling exhaust emissions from an internal combustion engine comprising:

an internal combustion engine having an air intake line and an exhaust line;

a particle filter in the exhaust gas line for filtering solid particles contained in exhaust gases;

a supplementary burner for burning solid particles supplied from the filter;

a combustion gas line for conveying combustion gases from the supplementary burner for transmittal to the air intake line; and an airflow meter in the air intake line;

wherein combustion gases from the supplementary burner are introduced into the air intake line at a location downstream of the airflow meter in the direction of flow of the fresh air in the air intake line.

10. An arrangement according to claim 9 including an exhaust gas turbocharger having a turbine in the exhaust line and a compressor in the air intake line and wherein combustion gases from the supplementary burner are introduced into the air intake line upstream of the compressor in the direction of flow of the fresh air in the air intake line.

11. An arrangement according to claim 9 including an exhaust gas recirculation line and a valve for recirculating some of the exhaust gas from the internal combustion engine from the exhaust gas line into the air intake line.

12. An arrangement according to claim 9 wherein the internal combustion engine is a compression ignition engine.

13. An arrangement according to claim 9 wherein, when a predetermined particle content in the particle filter is exceeded, the particles are supplied to the supplementary burner.

14. An arrangement according to claim 9 wherein the supplementary burner is turned on and off as a function of the quantity of particles supplied to the burner from the particle filter.

15. An arrangement according to claim 9 wherein the particles are conveyed by an air stream from the particle filter to the supplementary burner.

16. An arrangement for controlling exhaust emissions from an internal combustion engine comprising:

an internal combustion engine having an air intake line and an exhaust line;

a particle filter in the exhaust gas line for filtering solid particles contained in exhaust gases;

a supplementary burner for burning solid particles supplied from the filter;

a combustion gas line for conveying combustion gases from the supplementary burner for transmittal to the air intake line; and a Venturi tube for drawing combustion gases from the supplementary burner into the air intake line.

* * * * *